Jan. 8, 1935. J. DENZ 1,987,504

TOOL HOLDER

Filed Oct. 15, 1931

Inventor:
Joseph Denz
by Attorney:

Patented Jan. 8, 1935

1,987,504

UNITED STATES PATENT OFFICE 1,987,504

TOOL HOLDER

Joseph Denz, Basel, Switzerland

Application October 15, 1931, Serial No. 569,038
In France October 21, 1930

1 Claim. (Cl. 279—49)

My present invention relates to improvements in tool holders and has for its object to provide an improved centering milling drill-protector combined so as to be capable of accomplishing in a single operation centering, drilling and milling of any kind, shape and depth in metal, wood and other materials, the drilling and milling depth being adjustable independently in each case. A further advantage of my invention in contradistinction to known chucks resides in the fact that owing to the tightening of the drills and milling bits at any desired depth, these tools will be held forcibly centered on their entire length, whereby the perfect rotation of said tools will be secured, all the parts being interchangeable and resting in the holder, so as to avoid any warping of said parts, as it is the case for instance for the parts held in a screwed closing. Moreover the break of the drill is avoided and broken drills may still be used entirely. Again the cutting edges of double drills will not be damaged as in all the devices heretofore known and an average tightening difference of 5 millimeters will be obtained. The comparatively small head enables the drill as well as the bore at the narrowest and most difficult places to be looked after. The inner and outer pressure cones as well as all the other parts are interchangeable.

In the big drill chucks heretofore known, which in most cases do not for long rotate concentrically, the drills cannot be tightened at a sufficient depth and looked after in operation. This results in breaks or torsions of the drills, that is in too little efficiency. Broken drills cannot be used to the ends thereof and said known chucks cannot be used for delicate work, where no place is available for centering, drilling, milling, filing, rasping and the like.

My invention is illustrated by way of example in the accompanying drawing, wherein.

The jaw or tightening chuck $a$ is slotted to close the end of the tail and has any desired number of sufficiently large slots. Said jaw is provided with a bore corresponding to the maximum admissible diameter of the drill, so that the drill may be inserted either completely or to any desired depth into the sleeve $e$. At the opposite end the tail ends into tightening jaws $c$, both ends of which are provided with pressure cones.

Figure 1:
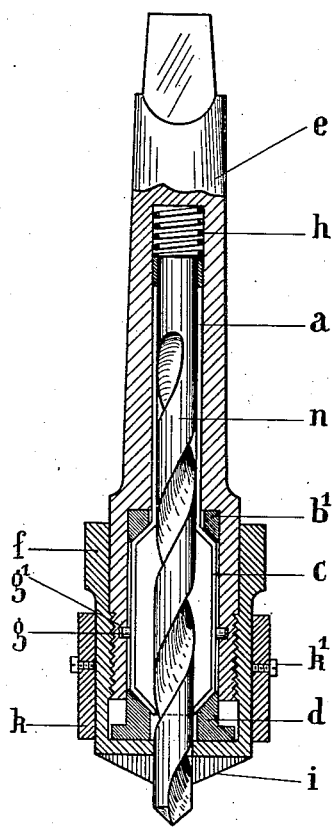
Fig. 1 is a longitudinal section of my improved drill chuck.
Figure 2:
Fig. 2 is an end elevation of a slotted tightening jaw.
Figure 6:
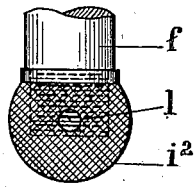
Fig. 6 shows a circular milling tool.
Figure 3:
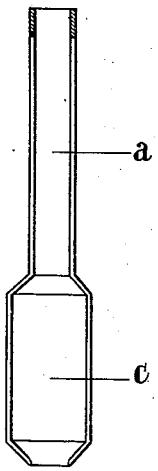
Fig. 3 is a plan view of said drill holding jaw.
Figure 7:
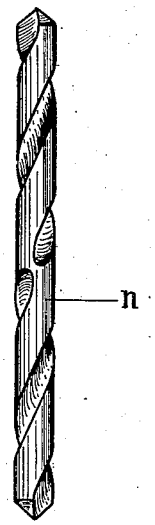
Fig. 7 shows a double drill.
Figure 4:
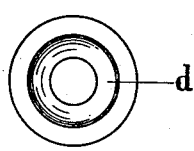
Fig. 4 shows a conical pressure ring.
Figure 5:
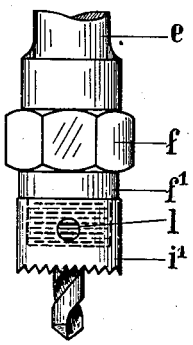
Fig. 5 shows a right angle milling tool.
Figure 8:
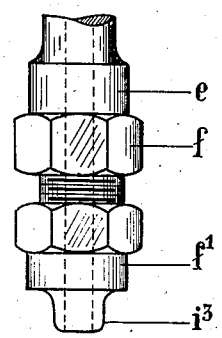
Fig. 8 shows a chip breaker.

The rear cone is inserted into the interchangeable counter-cone $b^1$, whilst the front cone is surrounded or embraced by the pressure cone $d$. Upon screwing the closing head $f$, the tightening jaws will be applied against the drill on their entire length without damaging the cutting edges of the drill, and as the four pressure cones are arranged within the sleeve $e$, the drill will always be forcibly and exactly centered. $g$ are pins secured to the tightening jaws, engaging corresponding slots $g^1$ in the sleeve $c$, whereby any rotation of the tightening jaw will be avoided. $i$, $i^1$, $i^2$, $i^3$ designate milling heads, chip-breakers and the like of any desired shape, adapted to be milled or otherwise formed directly on the head $f$ or attached to an interchangeable part $f^1$ screwed onto said head $f$, this last named arrangement being particularly convenient for operations with flexible shafts and the like. $k^1$ is an adjusting screw for the ring $k$. $h$ is a spring bearing against the drill holder. $l$ is the bore in the milling tool enabling it to be liberated without unscrewing the head $f$ and $n$ is a double drill shown in Fig. 7.

Having now fully described my said invention, what I claim and desire to secure by Letters Patent, is:

In combination, a chuck including a shank having a body portion formed with a longitudinally ranging bore, the lower portion of the bore being of increased diameter with respect to the upper portion to thereby present an abrupt shoulder above the lower end of the bore, with the inner surface of the enlarged portion of the bore arranged parallel to the axis of the shank, a gripping sleeve arranged in the bore of the shank and comprising a member longitudinally slitted from its lower end to a point below its upper end, with that portion of the gripping sleeve to be positioned in the enlarged portion of the body bore having upper and lower conical sections, a removable element bearing against the abrupt shoulder and formed on its lower surface to bear on and interfit with the upper conical sections of the sleeve, a pressure cone slidably fitted in the lower end of the shank and bearing on and guided by the wall of the enlarged portion of the bore, the upper surface of the pressure cone being formed to interfit with and bear against the lower conical sections of the sleeve, and a closing head having threaded connection with the exterior of the body and including a lower wall at right angles to the axis of the shank to engage and operate the pressure cone, the lower portion of the pressure cone having an outwardly extending flange to provide a broad bearing for cooperation with the head.

JOSEPH DENZ.